United States Patent
Irish et al.

(10) Patent No.: US 9,367,109 B2
(45) Date of Patent: Jun. 14, 2016

(54) SWITCHING POWER SUPPLY WITH NOISE CONTROL

(71) Applicant: QUALCOMM Incorporated, San Diego, CA (US)

(72) Inventors: Linda Stacey Irish, San Diego, CA (US); Francesco Carobolante, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 337 days.

(21) Appl. No.: 13/940,153

(22) Filed: Jul. 11, 2013

(65) Prior Publication Data

US 2015/0019882 A1    Jan. 15, 2015

(51) Int. Cl.
| | |
|---|---|
| G06F 1/26 | (2006.01) |
| H02M 1/44 | (2007.01) |
| H02M 3/335 | (2006.01) |
| H04B 3/54 | (2006.01) |
| H02M 1/36 | (2007.01) |
| H02M 7/04 | (2006.01) |
| H02M 1/00 | (2006.01) |

(52) U.S. Cl.
CPC . *G06F 1/26* (2013.01); *H02M 1/44* (2013.01); *H02M 3/33507* (2013.01); *H04B 3/54* (2013.01); *H02M 1/36* (2013.01); *H02M 7/04* (2013.01); *H02M 2001/007* (2013.01); *H04B 2203/5425* (2013.01)

(58) Field of Classification Search
CPC ....... G06F 1/26; H02M 1/44; H02M 3/33507; H02M 1/36; H02M 2001/007; H02M 7/04; H04B 3/28
See application file for complete search history.

(56) References Cited

U.S. PATENT DOCUMENTS

| | | | |
|---|---|---|---|
| 6,493,644 B1 | 12/2002 | Jonker et al. | |
| 7,119,499 B2 | 10/2006 | Ishigaki et al. | |
| 7,193,864 B2 | 3/2007 | Hansson et al. | |
| 8,582,320 B2 * | 11/2013 | Okitsu et al. | 363/19 |
| 2004/0149551 A1 * | 8/2004 | Porter | 200/1 R |
| 2012/0206064 A1 | 8/2012 | Archenhold | |
| 2013/0314059 A1 * | 11/2013 | Telefus | 323/234 |

FOREIGN PATENT DOCUMENTS

| | | |
|---|---|---|
| EP | 2341636 | 7/2011 |
| JP | 2004304747 | 10/2004 |
| WO | 03079527 | 9/2003 |

OTHER PUBLICATIONS

Ozdemir A., et al., "An Application Study about SMPS Design and Reduction of Common Mode Noises," International Conference on Electrical and Electronics Engineering, 2009, pp. I-306-I-310.

"PCT Application No. PCT/US2014/046375 International Search Report", Jan. 5, 2015, 11 pages.

* cited by examiner

*Primary Examiner* — Thuan Du
(74) *Attorney, Agent, or Firm* — DeLizio Law, PLLC

(57) ABSTRACT

On embodiment of a device with a noise adaptive power supply includes a noise adaptation unit configured to receive a noise adaptation signal. The noise adaptation unit can provide processing, such as digital filter processing to reduce the effect of power supply noise. In one embodiment, a feedback signal is used to adjust the output voltage of the power supply. The noise adaptation signal can be similar to the feedback signal. The noise adaptation unit can provide the processing in response to the noise adaptation signal.

31 Claims, 5 Drawing Sheets

SWITCHING POWER SUPPLY WITH NOISE CONTROL

BACKGROUND

Embodiments of the inventive subject matter generally relate to the field of power supplies and, more particularly, to power supply configuration with adaptive noise control.

Power supplies are used to power a wide variety of electronic devices. Some power supply outputs can include noise that can appear as small magnitude voltage variations superimposed on the output voltage. For example, if a power supply has a five volt DC (direct current) output, the power supply output can include noise in the form of high frequency voltage spikes. Often these voltage spikes are on the order of microseconds or milliseconds in duration, and can be on the order of 100 millivolts in amplitude. Switching power supply designs can have noisier output than other power supply designs because of the inherent current switching within the power supply. Switching power supply designs are often selected despite their noisier outputs because of low cost and high output current capability.

Power supply noise can adversely affect performance of electronic devices. For example, within an electronic communication device, power supply noise can decrease sensitivity to relatively low power communication signals. In some designs, power supply noise can effect communication signal reception, particularly if signal reception components are powered by the power supply outputs. Therefore, what is desired is a way to reduce the sensitivity of an electronic device to power supply noise.

SUMMARY

Disclosed herein are various embodiments of a power supply with adaptive noise control. In one embodiment, power supply can include a power module configured to provide an output voltage. The power module can include an input stage configured to receive an input voltage from a voltage source and an output stage, coupled to the input stage, and configured to provide the output voltage. The output voltage can be based, at least in part, on a feedback signal indicative of the difference between the output voltage and a reference voltage. The power supply can include a communication module configured to process communication signals. The communication module can include a voltage feedback module configured to provide the feedback signal to the output stage and provide a noise adaptation signal. The communication module can also include a communication processing block configured to modify signal processing of communication signals to reduce the effect of noise from the output voltage in response to the noise adaptation signal.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences and computer program products that embody techniques of the present inventive subject matter. However, it is understood that the described embodiments may be practiced without these specific details. For instance, although examples refer to communication systems using power lines as a communication medium, other communication systems can be used, such as wireless or wired communication systems. In other instances, well-known instruction instances, protocols, structures and techniques have not been shown in detail in order not to obfuscate the description.

Power supply noise can affect the performance of electronic equipment. For example, power supply noise can reduce the sensitivity of analog components in electronic communication devices. Some power supply designs can have noise on the power supply output related to the operation of the power supply. For example, switching power supply designs can have a switching component, such as a switching transistor that controls current flow within the power supply. As the switching component transitions between operating states, noise can be introduced to the power supply input and/or output.

Figure 1:
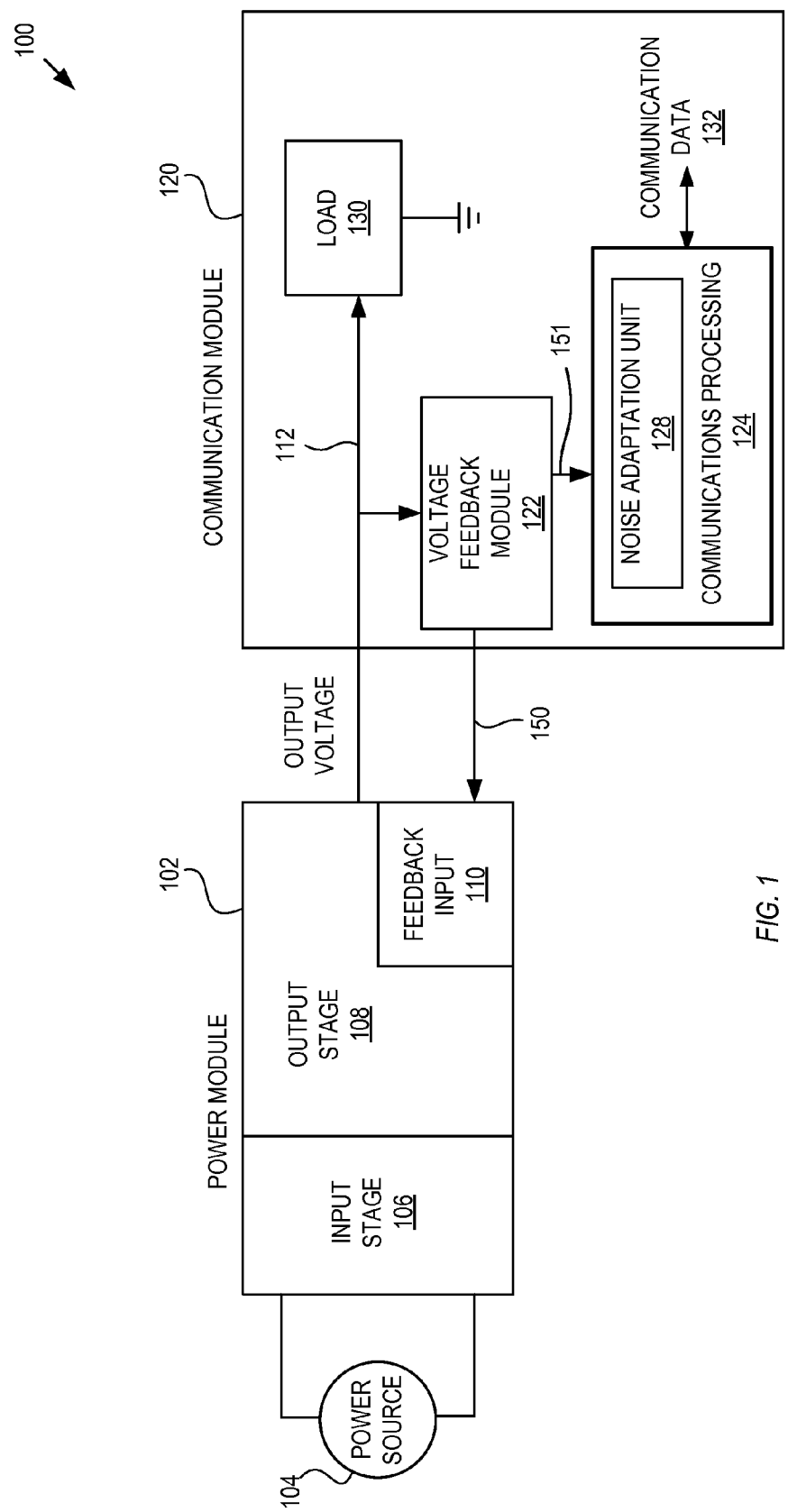
FIG. 1 is an example system diagram depicting a power module and a communication module.

Instead of adding additional components to filter the input voltage or output voltage, adaptive signal processing techniques can be used to reduce the effects of noise from the power supply. In one embodiment, digital filters can be used adaptively in response to a signal, such as a feedback signal, in the power supply. The signal processing techniques can be applied within modules that are coupled to (powered by) the power supply output voltage instead of within the power supply itself FIG. 1 is an example system diagram 100 depicting a power module 102 and a communication module 120. In one embodiment, power module 102 can be implemented as a separate device from communication module 120. Such an embodiment may have a lower cost since power components can be separated from logic components. In another embodiment, power module 102 and communication module can be implemented within a single device. Such an embodiment may be more compact (with respect to the multi-device embodiment). The power module 102 is configured to receive power from a power source 104, process the received power and then provide an output voltage 112. For example, input stage 106 can filter the received power. In one embodiment, the power source 104 can be an alternating current (AC) voltage source, such as a 110 volt AC voltage commonly used in North America. In another embodiment, the power source 104 can be a direct current (DC) voltage source. In some implementations, the input stage 106 can include a rectifier for rectifying an AC voltage to a DC voltage.

Output stage 108 is coupled to input stage 106 and can provide the output voltage 112 for use by other modules, such as the communication module 120. The output voltage 112 can be determined, at least in part, by a feedback signal 150 received at feedback input 110. The feedback signal 150 can adjust output voltage 112 to a higher or lower voltage level. Often, the output voltage 112 can be controlled to within a tolerance level of a reference voltage level by feedback signal 150. In one embodiment, output stage 108 can include a switching power supply where the output voltage 112 of the switching power supply can be adjusted by the feedback signal 150. The feedback signal 150 is described further in conjunction with voltage feedback module 122 below.

The communication module 120 can include a load 130. The load 130 can include electronic circuits, memory, processors and the like that can dissipate power from the power module 102. As shown in FIG. 1, the load 130 can be directly coupled to the output voltage 112 from the power module 102. In other embodiments, the load 130 can be indirectly coupled to the output voltage 112 such as through one or more voltage regulators (not shown) disposed between the output voltage 112 and the load 130.

The voltage feedback module 122 can be configured to compare the output voltage 112 to the reference voltage level and can provide the feedback signal 150 to the power module 102. The feedback signal 150 can vary with respect to the difference between the output voltage and the reference voltage level. For example, if the output voltage 112 is lower than the reference voltage level, then the feedback signal 150 can signal the power module 102 to adjust the output voltage 112 to a higher voltage level. Conversely, if the output voltage 112 is a higher level than the reference voltage level, then the feedback signal 150 can signal the power module 102 to adjust the output voltage to a lower voltage level. In one embodiment, the output stage 108 can include a switching transistor (not shown) and the feedback signal 150 can be coupled to the switching transistor. Thus, the feedback signal 150 can provide the switching signal for the switching transistor.

The communication processing block 124 in communication module 120 may include electronic circuitry and components for signal processing operations related to communications signals such as signal processing circuitry for communication over power lines described by HomePlug® specifications or Wi-Fi® communications, such as those described by IEEE 802.11 standards. In one embodiment, communication data 132 is encoded by the communication processing block 124 for transmission through a communication medium (e.g., power lines or Wi-Fi). The communication processing block 124 can also receive communication signals from the communication medium, decode the communication signals and provide communication data 132.

In one embodiment, power module 102 may produce power supply noise on the output voltage 112 when the output voltage 112 is adjusted by the feedback signal 150. For example, the power supply noise can appear as noise spikes on the output voltage 112 at the same (fundamental) frequency as the feedback signal 150. The power supply noise in the output voltage 112 can also exist at frequencies harmonically related to the feedback signal 150. The output stage 108 can include a switching component configured to receive the feedback signal 150 that can introduce noise in the output voltage 112. Generally, power supply noise can reduce sensitivity of the communication processing block 124 to low power (low amplitude, low signal strength) communication signals, thereby reducing performance of the communication module 120. In some embodiments, the power supply noise may interfere with signal processing operations provided by the communications processing block 124. For example, noise in the output voltage 112 can interfere with the communications processing block 124 as communication signals are received and decoded from a communication medium.

In one embodiment, the voltage feedback module 122 can also provide a noise adaptation signal 151 to a noise adaptation unit 128 in the communication processing block 124. The noise adaptation signal 151 may be related (in frequency, amplitude or timing for example) to the feedback signal 150 provided to the power module 102. In some implementations, the noise adaptation signal 151 can be substantially similar to the feedback signal. The noise adaptation unit 128 can modify signal processing operations within the communications processing block 124 in response to receiving the noise adaptation signal 151 from the voltage feedback module 122. For example, the noise adaptation unit 128 can apply additional filtering and/or additional signal processing operations, such as digital signal processing to the signal processing of communication signals in response to receiving the noise adaptation signal 151. The additional filtering and/or additional signal processing operations can be configured to reduce the effect of power supply noise produced by the power module 102 in response to receiving the feedback signal 150. The power supply noise from the power module 102 may be characterized prior to operating the communication module 120 to determine parameters for the additional filtering and/or additional signal processing operations. For example, operation of the power module 102 can be simulated during a design phase to characterize the power module 102 and determine filtering parameters. In another example, experimentation or historical data can be used to determine filtering parameters. In one embodiment, the additional filtering and/or signal processing operations can provide a "coarse adjustment" to reduce the effect of power supply noise. That is, the parameters may not remove all the effects of power supply noise, but may provide an initial setting. Further parameters may be determined during operation of the communication module 124 by correlating the feedback signal 150 to collected statistics related to power supply noise such as noise in the communication medium. These parameters can provide a "fine adjustment" to further reduce the effects of power supply noise. In another embodiment, the filtering and/or signal processing parameters can be determined by the noise adaptation unit 128 in "real time" as the power module 102 operates. The filtering and/or signal processing parameters may be stored in the communication processing block 124, noise adaptation unit 128 or any other technically feasible storage device or location. The additional filtering and/or signal processing operations can reduce effects of the power supply noise attributed to the power module 102 and provide increased sensitivity for signal processing operations in the communication processing block 124.

In one embodiment, a communication system can be configured to use an AC powerline as a communication medium. For example, the communication system can be configured to communicate using powerline communication (PLC) protocols. This embodiment is described below in FIG. 2.

Figure 2:
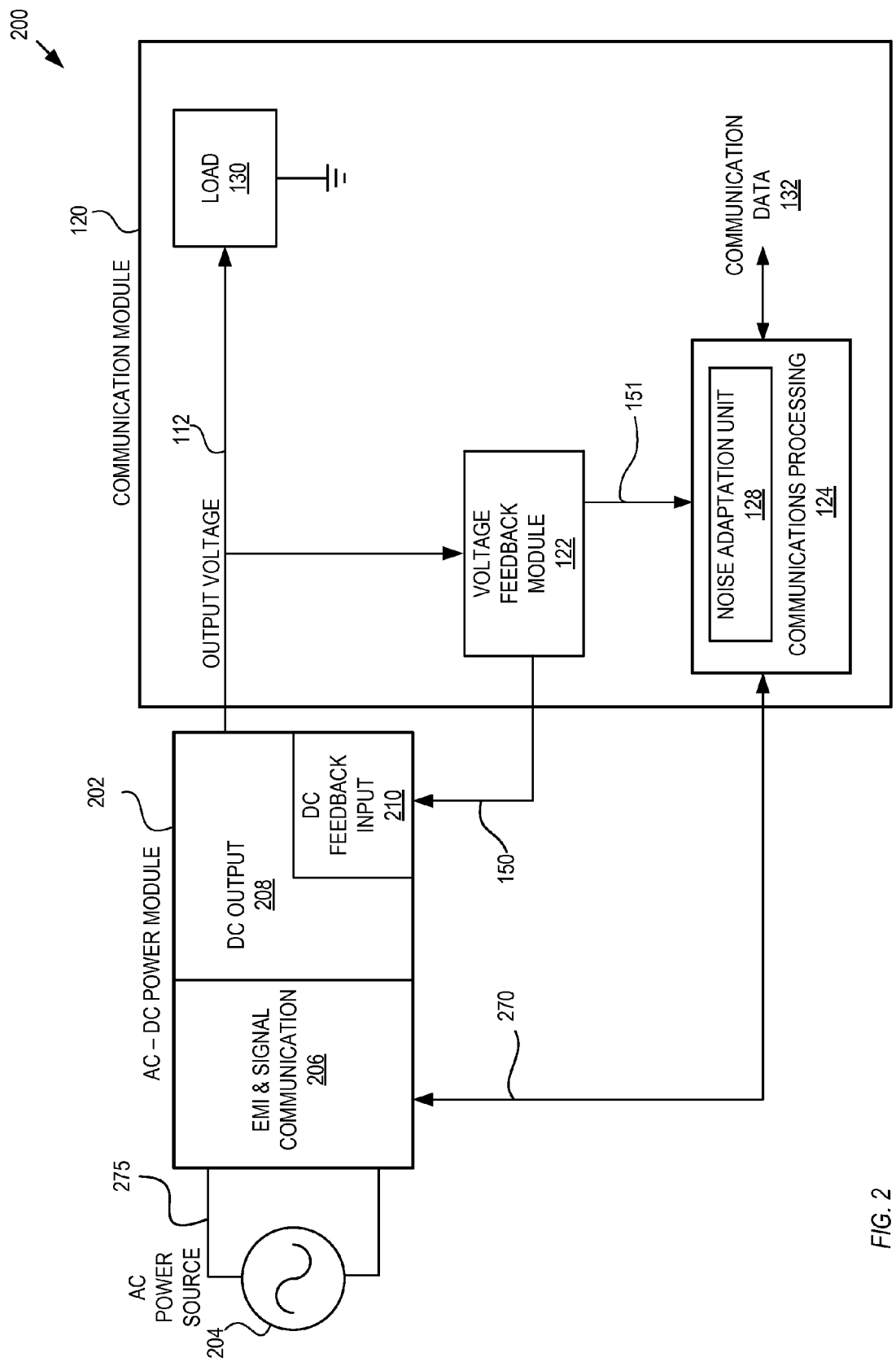
FIG. 2 is another example system diagram depicting a power module and a communication module.

FIG. 2 is another example system diagram 200 depicting an AC-DC power module 202 and the communication module 120. In one embodiment, AC-DC power module 202 can be implemented as a separate device from communication module 120. In another embodiment, power module 102 and communication module can be implemented within a single device. The AC-DC power module 202 receives power from an AC power source 204 and provides the output voltage 112. The AC-DC power module 202 is coupled to the AC power source 204 through an electro-magnetic interference (EMI) and communication signal block 206. The EMI and communication signal block 206 can include an EMI filter used to filter AC power signals to prevent accidental radiation or conduction of electromagnetic signals that can cause interference to other devices. Additionally, the EMI and communication signal block 206 can couple communication signals 270 to AC power lines 275 (the communication signals 270 will be described below in conjunction with the communication module 120).

DC output module 208 in the AC-DC module 202 is coupled to the EMI and communication signal block 206. The DC output module 208 can provide the output voltage 112 used by other modules such as the communication module 120. The output voltage 112 can be determined, at least in part, by the feedback signal 150 received at a DC feedback input 210. As described above, the feedback signal 150 can adjust the output voltage 112 to a higher or lower level. In one embodiment, the DC output module 208 can include a switching power supply where the output voltage 112 of the switching power supply can be adjusted by the feedback signal 150.

The communication module 120 can include a load 130. As described above, the load 130 can dissipate power from the output voltage 112. The communication module 120 includes the voltage feedback module 122. The voltage feedback module 122 can be configured to compare the output voltage 112 to a reference voltage level. In one embodiment, the voltage feedback module 122 can include a voltage comparator (not shown) configured to compare the output voltage 112 to the reference voltage. The voltage feedback module 122 can provide the feedback signal 150 to the DC feedback input 210 responsive to the difference between the output voltage 112 and the reference voltage level. In one implementation, the DC output module 208 can include a switching transistor (not shown) and the feedback signal 150 can be coupled to the switching transistor. The switching transistor is described in more detail below in conjunction with FIG. 3.

The communication module 120 includes a communication processing block 124. The communication processing block 124 may include circuitry for processing communication signals such as signal processing circuitry for powerline communication (PLC) 275 described by HomePlug specifications. In one implementation, communication data 132 is encoded by communication processing block 124 into communication signals 270 and the communication signals 270 are coupled to power lines 275 through EMI and communication signal block 206. The communication processor block 124 can also receive communication signals 270 from the power lines 275 (in the example of FIG. 2, through EMI and communication signal block 206) and decode the communication signals and provide communication data 132.

In one implementation, AC-DC power module 202 may produce noise as the output voltage 112 is adjusted by the feedback signal 150. Similar to as described above, the noise from the AC-DC power module 202 may interfere with the communications provided by the communications processing block 124. For example, noise in the output voltage 112 can interfere with the communications processing block 124 as communication signals 270 are received and decoded from the communication medium. In another implementation, noise may be induced in the AC-DC power module 202 by the feedback signal 150. The induced noise can affect the coupling between communication signals 270 and the communication medium.

In one embodiment, the voltage feedback module 122 can provide the noise adaptation signal 151 to the noise adaptation unit 128. The noise adaptation signal 151 may be related (in amplitude, frequency or waveform shape, for example) to the feedback signal 150 provided to the AC-DC power module 202, and in some implementations, the noise adaptation signal 151 can be substantially similar to the feedback signal 150. The noise adaptation unit 128 can modify signal processing operations within the communications processing block 124 in response to receiving the noise adaptation signal 151 from the voltage feedback module 122. As described above, the communication processing block 124 can apply additional filtering to the processing of communication signals 270. The additional filtering can be configured to reduce the effects of noise from the output power 112 from the AC-DC power module 202.

Figure 3:
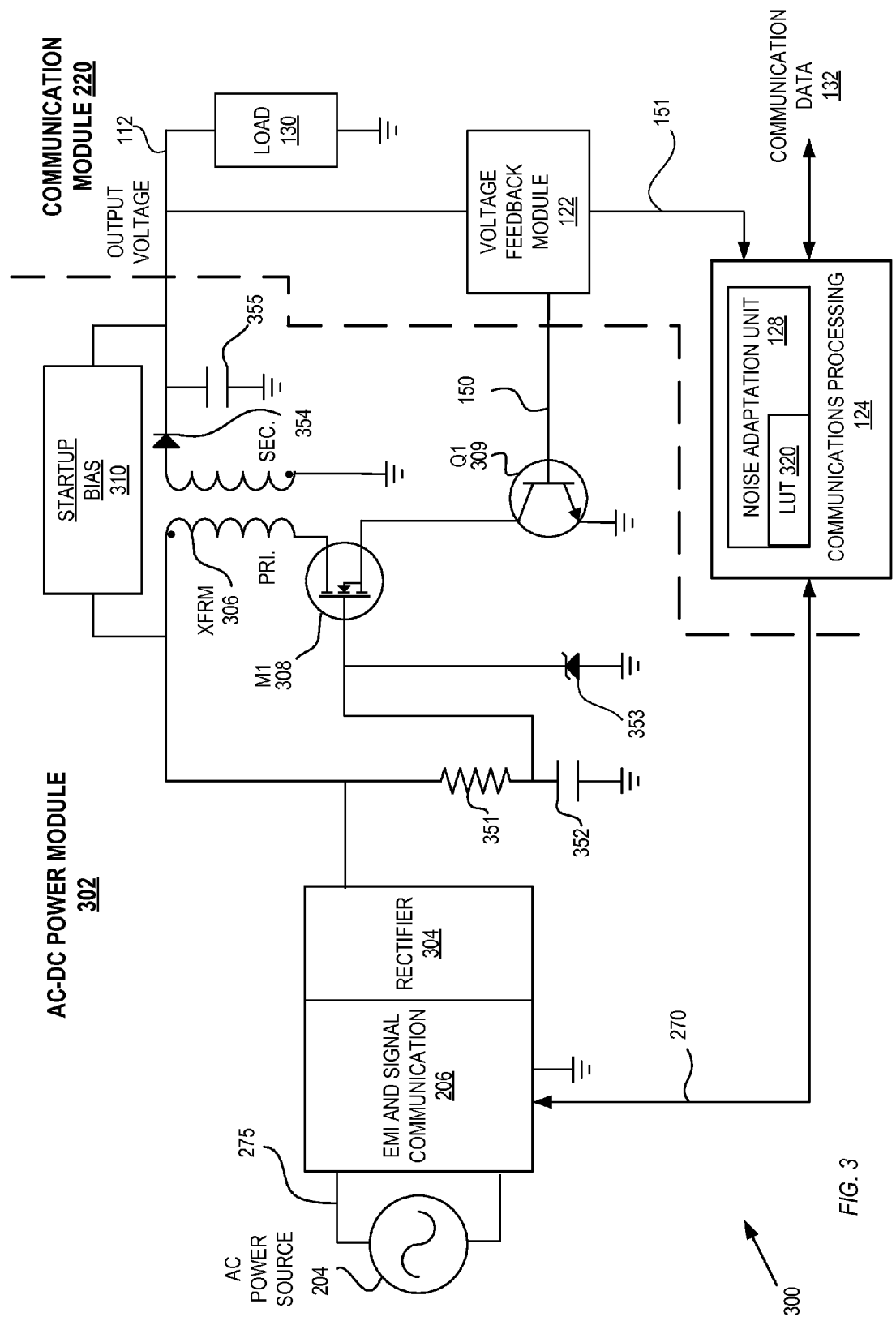
FIG. 3 is an example block diagram of a non-isolated power module and communication module.

FIG. 3 is an example block diagram 300 of a non-isolated AC-DC power module 302 and communication module 120. As depicted, the AC-DC power module 302 is shown on the left side of the dashed line while the communication module 120 is shown on the right side of the dashed line. Some components and structures have not been shown in detail in both the AC-DC power module 302 and the communication module 120 in order not to obfuscate the drawing.

A non-isolated power module provides a direct coupling between a power source and a supplied output voltage. A direct coupling has no electrical isolation between the power source (the AC power source 204 in this example) and the output power 112, ground and feedback signal 150. Typically, non-isolated power modules may be used when there is little chance for a user to be exposed to signals that can directly couple to hazardous voltages, such as those provided by the AC power source 204. For example, if the system 300 is a Wi-Fi communication system, there is very little opportunity for the user would be exposed to hazardous AC power since no wired connections would be exposed to the user.

The AC-DC power module 302 receives AC power from the AC power source 204 through power lines 275 and provides the output voltage 112. The AC power source 204 is coupled to the EMI and communication signal module 206 through power lines 275. AC power from the AC power source 204 is filtered by the EMI and communication signal module 206 and is coupled to rectifier 304. Rectifier 304 can be a full wave rectifier, a half wave rectifier or any other technically feasible rectifier configuration that can rectify the AC signals into DC signals. The output of the rectifier 304 is coupled to a first terminal of a primary side of a transformer 306. The transformer 306 can be configured to step up (increase) or step down (decrease) a voltage provided on a secondary side with respect to the primary side.

The gate of a MOSFET (metal oxide semiconductor field effect transistor) M1 308 can be biased by resistor 351, capacitor 352 and zener diode 353. As shown, the output of the rectifier 304 is coupled to a first terminal of the resistor 351. A second terminal of the resistor 351 is coupled to a first terminal of the capacitor 352. A second terminal of the capacitor 352 is coupled to ground. The second terminal of the resistor 351 is also coupled to the gate of MOSFET M1 308.

A second terminal of the primary side of the transformer 306 is coupled to the MOSFET M1 308. The MOSFET M1 308 is coupled to a switching transistor Q1 309. The cascode coupling configuration of MOSFET M1 308 and switching transistor Q1 309 shown in FIG. 3 allows high switching voltages to be handled by the MOSFET 308 M1 while being controlled by a low voltage signal through transistor Q1 309. Although M1 308 is depicted as a MOSFET and Q1 309 is depicted as a bipolar transistor in FIG. 3, M1 308 and/or Q1 309 can be implemented with any other technically feasible semiconductor or mechanical switching device. In some implementations only a single transistor can be used to replace the MOSFET M1 308 and transistor Q1 309 pair (abandoning the cascode configuration), particularly if the voltages from the transformer 306 do not exceed the operating voltage ratings of the single transistor. Although the arrangement of components shown in the embodiment of FIG. 3 depicts one topology (i.e., a Flyback topology) that can be used for DC-DC conversion, it is noted that in other embodiments other topologies may be used to provide similar functionality.

Transistor Q1 309 can operate as a switching transistor and can conduct current based, at least in part, on the feedback signal 150. The secondary side of transformer 306 produces the output voltage 112. The secondary side of the transformer 306 can be coupled to a first terminal of diode 354. A second terminal of diode 354 is coupled to a first terminal of capacitor 355. A second terminal of capacitor 355 is coupled to ground. The diode 354 and the capacitor 355 can smooth the output of the secondary side of transformer 306. The output voltage 112 is coupled to the load 130. The output voltage 112 is also coupled to the voltage feedback module 122. The voltage feedback module 122 can provide the feedback signal 150 to transistor Q1 309 based, at least in part, on the difference between the output voltage 112 and a reference voltage level. The voltage feedback module 122 can also provide a noise adaptation signal 151 to the noise adaptation unit 128. The noise adaptation signal 151 may be related (in amplitude, frequency or waveform shape, for example) to the feedback signal 150, and in some implementations, the noise adaptation signal 151 can be substantially similar to the feedback signal 150.

As described above, the communications processing block 124 can encode and decode communication signals carried on the AC power lines 275 and provide (or accept) communication data 132. The noise adaptation unit 128 can modify signal processing operations within the communications processing block 124 in response to receiving the noise adaptation signal 151. As described above, the signal processing operations can be modified to include additional filtering and/or additional signal processing operations configured to reduce the effects of noise produced by the AC-DC power module 302 when receiving the feedback signal 150. Parameters for the additional filtering and/or additional signal processing operations can be determined through simulation, experimentation or historical data with respect to operating the AC-DC power module 302. Parameters for the additional filtering and/or additional signal processing operations can be stored in the communication processing block 124, the noise adaptation unit 128 or any other technically suitable memory or storage device. In one embodiment, parameters can be stored in a look up table (LUT) 320 included in the noise adaptation unit 128. The LUT 320 can be configured to store signal processing parameters that can be used by the communication processing block 124 to reduce the effect of noise from the AC-DC power module 302. For example, signal processing parameters can be retrieved from LUT 320 in response to receiving the noise adaptation signal 151. In one embodiment, a plurality of signal processing parameters can be stored in LUT 320 based on statistics of noise attributed to the power module 302 (such as noise due to feedback signal 150) to communication signals 270. The noise can be analyzed (statistics gathered) during characterization of the system shown in diagram 200 or while the system is in operation using controlled recursive tests. Different signal processing parameters can be retrieved from LUT 320 in response to different signal levels and/or statistics of communication signals 270.

In some implementations, startup bias module 310 can be used to provide the output voltage 112 during a power-up event, until the feedback signal 150 stabilizes and the output of the transformer 306 (i.e., the output voltage 112) becomes stable. After the output of transformer 306 is stable, the startup bias module 310 can be turned off and placed in a high impedance mode. In one embodiment, the startup bias module can include either a high value resistor and/or a depletion mode field effect transistor (FET). In the case of a high value resistor, a small current, typically less than 1 mA can be used to bring up the output voltage 112 when first connected to power. The load 130 should draw less than the supplied current until switching transistor Q1 309 begins to conduct. Once switching transistor Q1 conducts responsive to the feedback signal 150, the transformer 306 provides all of the current needed by the load 130. At that point, the load 130 can draw more than the current supplied by the high value resistor. The depletion mode FET can be used in conjunction with the high value resistor to disconnect the startup bias module 310 once the transformer 306 supplies current to the load 130 to increase overall efficiency.

Figure 4:
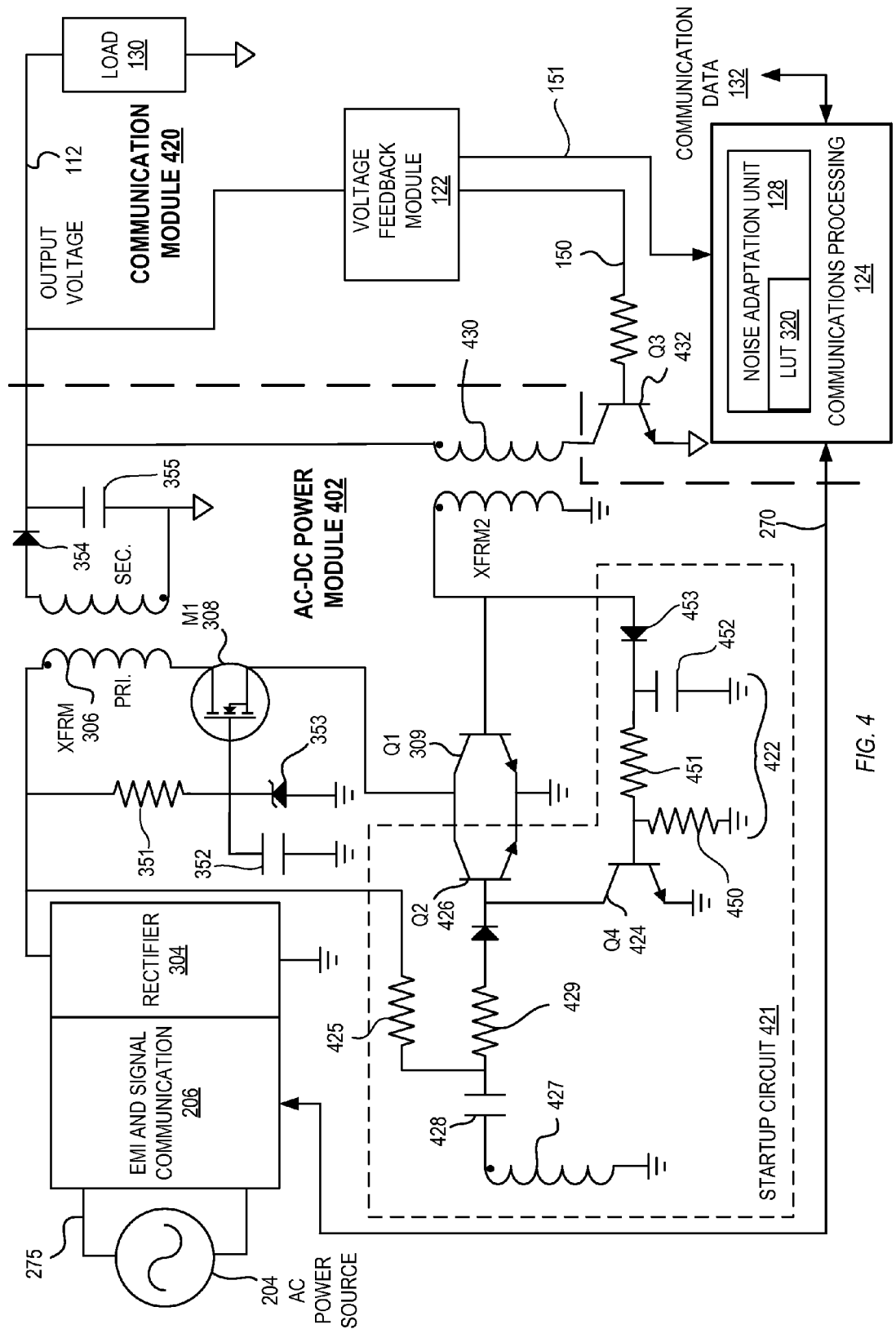
FIG. 4 is an example block diagram of an isolated power module and communication module in a communication system.

FIG. 4 is an example block diagram 400 of an isolated AC-DC power module 402 and communication module 420. As depicted, the AC-DC power module 402 is shown on the left side of the dashed line while the communication module 420 is shown on the right side of the dashed line. In contrast to a non-isolated power module, an isolated power module has no direct coupling between any signals entering or leaving the isolated power module and the communication module 420. Isolated power modules may be safer than non-isolated power modules since no direct coupling paths to hazardous voltages (in this example, AC power source 204) are provided.

The AC-DC power module 402 receives AC power from the AC power source 204. The AC power source 204 is coupled to the EMI and communication signal module 206 through the power lines 275. AC power from the AC power source 204 is filtered by the EMI and communication signal module 206 and is coupled to rectifier 304. The output of the rectifier 304 is coupled to a first terminal of a primary side of a transformer 306. As described above, the gate of the MOSFET M1 308 can be biased by resistor 351, capacitor 352 and zener diode 353. A second terminal of the primary side of the transformer 306 is coupled to MOSFET M1 308. The MOSFET M1 308 is coupled to a switching transistor Q1 309 in a cascode configuration. The configuration and operation of MOSFET M1 308 and switching transistor Q1 309 is described above in conjunction with FIG. 3

The output voltage 112 from the secondary side of transformer 306 is coupled to the load 130. As described above, the diode 354 and the capacitor 355 can smooth the output of the secondary side of transformer 306. The feedback signal 150 is coupled indirectly to transistor Q1 309. The voltage feedback module 122 can also provide the noise adaptation signal 151 to the noise adaptation unit 128. The noise adaptation signal 151 may be related (in amplitude, frequency or waveform shape, for example) to the feedback signal 150, and in some implementations, the noise adaptation signal 151 can be substantially similar to the feedback signal 150.

In some embodiments, although transistor Q1 309 directly controls the current in the primary side of the transformer 306, the feedback signal 150 is not directly connected to the transistor Q1 309. The feedback signal 150 is coupled to the switching transistor 309 through transistor Q3 432 and an isolation coupler such as a second transformer 430. The second transformer 430 can prevent coupling hazardous voltages (i.e., AC power source 204) to the communication module 420. In one embodiment, second transformer 430 can be an isolation transformer with a 1:1 winding ratio. Other technically feasible methods of isolation may be used in place of the second transformer 430. For example, an opto-electronic coupling such as a photo-diode or photo-transistor (not shown) may be used.

As described above, the communications processing block 124 can encode and decode communication signals 270 carried on the AC power lines 275 and provide (or accept) communication data 132. Noise adaptation unit 128 can modify signal processing operations within the communications processing block 124. For example, the signal processing operations can be modified to include additional filtering configured to reduce the effects of noise produced by the AC-DC power module 402 when receiving the feedback signal 150. In one embodiment, the noise adaptation unit 128 can include the LUT 320. As described above, the LUT 320 can be configured to store signal processing parameters that can be used by the communication processing block 124 to reduce the effect of noise from the AC-DC power module 302.

Startup circuit 421 (shown in the dashed box in FIG. 4) may be used to provide an initial switching pathway for MOSFET M1 308 during a power-up event and before the feedback signal 150 is coupled through the second transformer 430. In one embodiment, the startup circuit 421 can be a ringing choke circuit formed by inductor 427 coupled to the transformer 306 further coupled to capacitor 428 and resistors 425 and 429 configured to oscillate at a frequency determined, at least in part, by their component values and any parasitic component values. The oscillation can operate transistor Q2 426, and thereby control current in the primary side of transformer 306 even when transistor Q1 309 remains off. Note that in the depicted configuration transistor Q1 309 is emitter and collector coupled to Q2 426.

The startup circuit 421 can be disabled by a detection circuit such as a peak detector 422 and transistor Q4 424. The peak detector 422 can be configured to determine signal activity from feedback signal 150 by filtering the signal with components such as resistors and capacitors. In one embodiment, the peak detector 422 includes a capacitor 452 and two series connected resistors (resistor 450 and resistor 451) and diode 453. A first terminal of diode 453 is coupled to the output of the second transformer 430. The second terminal of the diode 453 is coupled to a first terminal of capacitor 452. The second terminal of capacitor 452 is coupled to ground. The first terminal of capacitor 452 is also coupled to a first terminal of resistor 451. The second terminal of resistor 451 is coupled to a first terminal of resistor 450 and the base of transistor Q4 424. The second terminal of resistor 450 is coupled to ground.

As the feedback signal 150 becomes active, the transistor Q3 432 operates and a signal similar to the feedback signal 150 is coupled to the second transformer 430. The output of the second transformer 430 is coupled to transistor Q1 309. As described above in FIG. 3, transistor Q1 309 acts as the switching transistor for current in transformer 306. The signal from the output of the second transformer 430 is coupled to the peak detector 422. As the coupled signal enters the peak detector 422, transistor Q4 424 is enabled and couples the base of transistor Q2 426 to a low potential (near ground) disabling transistor Q2 426 and thereby disabling the startup circuit 421.

Figure 5:
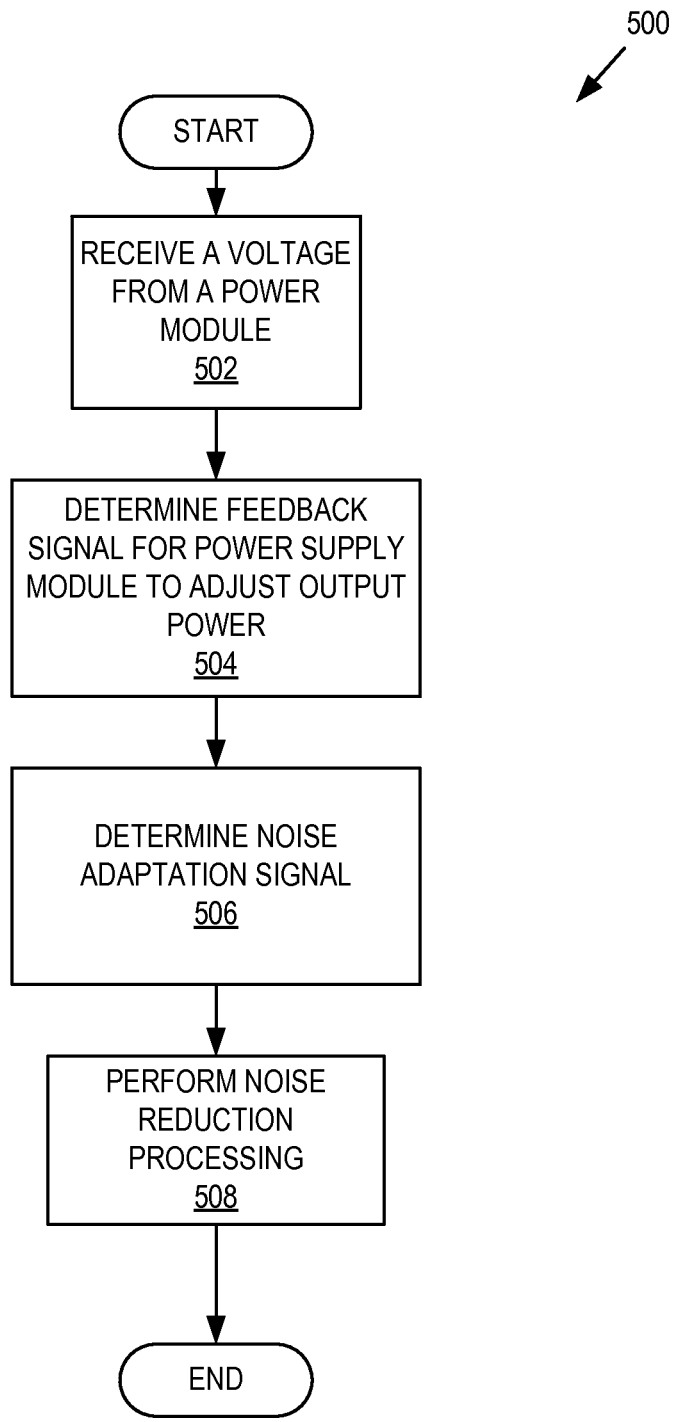
FIG. 5 is a flowchart of example operations for a power module and a communication module with adaptive noise control.

FIG. 5 is a flowchart 500 of example operations for a power module and a communication module with adaptive noise control. The method of FIG. 5 is described with reference to the systems and components described in FIGS. 1-4 (for illustration purposes and not as a limitation). The example operations can be carried out by one or more components in those figures such as, but not limited to, AC-DC power module 202, communication module 120 and noise adaptation unit 128.

The flow can begin in block 502 when a voltage is received from the power module 102. In one embodiment, the voltage can be received at the communication module 120 and the power module can also be AC-DC power module 302 or AC-DC power module 402. The power module 102 can be configured to provide an output voltage 112 to other modules such as communication module 120 or communication module 420.

Proceeding to block 504, the feedback signal 150 is determined in order to adjust the voltage from the power module 102. In one embodiment, the feedback signal 150 can be determined by the voltage feedback module 122. As described above, the feedback signal 150 can describe the difference between the output voltage 112 and a reference voltage level and can adjust the output voltage 112 to a higher or lower level. For example, if the output voltage 112 is lower than the reference voltage level, then the feedback signal 150 can adjust the output voltage 112 to a higher voltage level (a voltage greater than the current output voltage 112). Conversely, if the output voltage 112 is a higher voltage than the reference voltage level, then the feedback signal 150 can adjust the output voltage 112 to a lower voltage level (a voltage lower than the current output voltage 112.

Proceeding to block 506, the noise adaptation signal 151 is determined. The noise adaptation signal 151 can be related to the feedback signal 150. For example, the noise adaptation signal can be similar in amplitude, frequency or waveform shape to the feedback signal 150. In one embodiment, the noise adaptation signal 151 can be substantially similar to the feedback signal 150.

Proceeding to block 508, noise reduction processing is performed in response to receiving the noise adaptation signal 151 and the flow can end. In one embodiment, the noise reduction processing can be performed on the communication signals 270 and can include applying additional filtering or signal processing operations, such as digital signal processing, to the signal processing operations on the communication signals performed in the communication module 120. In another embodiment, the signal processing operations on communication signals is performed in the communications processing module 124. The noise reduction processing can reduce the effects of noise coupled from the power module 102 to the communication signals 270. In one embodiment, noise from the voltage from the power module 102 can be related to the feedback signal 150. The noise coupled from the power module 102 may be characterized prior to operating the communication module 120 or communications processing module 124. Since the noise is characterized, the effects of the noise can be reduced through the additional signal processing.

It should be understood that FIGS. 1-5 and the operations described herein are examples meant to aid in understanding embodiments and should not be used to limit embodiments or limit scope of the claims. Embodiments may perform additional operations, fewer operations, operations in a different order, operations in parallel, and some operations differently.

As will be appreciated by one skilled in the art, aspects of the present inventive subject matter may be embodied as a system, method, or computer program product. Accordingly, aspects of the present inventive subject matter may take the form of an entirely hardware embodiment, a software embodiment (including firmware, resident software, microcode, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A device comprising:
   a power module configured to provide an output voltage, the power module comprising:
      an input stage configured to receive an input voltage from a voltage source, and
      an output stage coupled to the input stage, the output stage configured to provide the output voltage based, at least in part, on a feedback signal indicative of a difference between the output voltage and a reference voltage; and
   a communication module configured to process communication signals, the communication module comprising:
      a voltage feedback module configured to
         receive the output voltage from the output stage,
         provide the feedback signal to the power module, and
         provide a noise adaptation signal, based at least in part, on the feedback signal, and
      a communication processing block configured to modify a signal processing operation on the communication signals in response to receiving the noise adaptation signal, wherein the modified signal processing operation reduces an effect of noise from the power module on the communication signals.

2. The device of claim 1, wherein the communication processing block is configured to:
   determine at least one signal processing parameter based, at least in part, on the noise adaptation signal; and
   modify the signal processing operation on the communication signals based, at least in part, on the at least one signal processing parameter.

3. The device of claim 2, wherein the communication processing block configured to determine the at least one signal processing parameter comprises the communication processing block further configured to:
   determine a plurality of signal processing parameters;
   store the plurality of signal processing parameters; and
   select at least a subset of the plurality of signal processing parameters, based, at least in part, on the noise adaptation signal to modify the signal processing operation on the communication signals.

4. The device of claim 3, wherein the communication processing block comprises a look up table to store the plurality of signal processing parameters.

5. The device of claim 3, wherein the communication processing block configured to select at least the subset of the plurality of signal processing parameters, is further configured to select at least the subset of the plurality of signal processing parameters, based, at least in part, on states of the noise adaptation signal.

6. The device of claim 1, wherein the input voltage is an alternating current (AC) input voltage and the input stage is configured to receive the input voltage from an AC power line.

7. The device of claim 6, wherein the communication module is configured to provide communication data for transmission via the communication signals through the AC power line.

8. The device of claim 1, wherein the noise adaptation signal is the feedback signal.

9. The device of claim 1, wherein the output stage comprises a switching component configured to control current flow in the output stage.

10. The device of claim 1, wherein the feedback signal is coupled to a switching component.

11. The device of claim 1, wherein noise coupled to the communication signals is characterized prior to operating the device.

12. A device comprising:
   a power module comprising:
      an alternating current (AC) input stage configured to receive AC power through AC power lines and couple communication signals to the AC power lines, and
      a direct current (DC) output stage configured to receive the AC power from the AC input stage and provide a DC output voltage based, at least in part, on a feedback signal indicative of a difference between the DC output voltage and a reference voltage; and
   a communication module configured to process the communication signals, the communication module comprising:
      a voltage feedback module configured to receive the DC output voltage from the DC output stage, provide the feedback signal to the power module, and provide a noise adaptation signal, based at least in part, on the feedback signal, and a communication processing block configured to receive the communication signals from the power module, and modify a signal processing operation on the communication signals in response to receiving the noise adaptation signal, wherein the modified signal processing operation reduces an effect of noise from the power module on the communication signals.

13. The device of claim 12, wherein the communication processing block is configured to:

determine at least one signal processing parameter based, at least in part, on the noise adaptation signal; and modify the signal processing operation on the communication signals based, at least in part, on the at least one signal processing parameter.

14. The device of claim 13, wherein the communication processing block configured to determine the at least one signal processing parameter comprises the communication processing block further configured to:

determine a plurality of signal processing parameters;
store the plurality of signal processing parameters; and
select at least a subset of the plurality of signal processing parameters, based, at least in part, on the noise adaptation signal to modify the signal processing operation on the communication signals.

15. The device of claim 14, wherein the communication processing block comprises a look up table to store the plurality of signal processing parameters.

16. The device of claim 14, wherein the communication processing block configured to select at least the subset of the plurality of signal processing parameters, comprises the communication processing block configured to select at least the subset of the plurality of signal processing parameters, based, at least in part, on states of the noise adaptation signal.

17. The device of claim 12, wherein the power module comprises a switching transistor configured to control current flow in the power module, wherein the feedback signal is configured to operate the switching transistor.

18. The device of claim 17, further comprising an isolation coupler configured to couple the feedback signal to the switching transistor.

19. The device of claim 12, wherein the power module comprises a startup bias circuit configured to provide the DC output voltage during a power-up event.

20. The device of claim 18, further comprising a detection circuit configured to detect a feedback signal activity, wherein the detection circuit is coupled to the feedback signal through the isolation coupler.

21. The device of claim 20, further comprising a startup circuit configured to operate the switching transistor during a power-up event, wherein the power-up event is indicated when the feedback signal activity is not detected via the detection circuit.

22. The device of claim 21, wherein the startup circuit comprises a ringing choke circuit configured to operate the switching transistor.

23. The device of claim 12, wherein the noise adaptation signal is the feedback signal.

24. The device of claim 12, wherein the power module comprises a switching transistor coupled to a metal oxide semiconductor field effect transistor (MOSFET) in a cascode configuration, wherein the switching transistor and the MOSFET are configured to control current flow in the power module.

25. The device of claim 12 wherein noise from the power module is characterized prior to operating the device.

26. A method comprising:

receiving, at a communication module of a device, a voltage and communication signals from a power module of the device;

determining a feedback signal at the communication module, wherein the feedback signal adjusts the voltage from the power module;

determining a noise adaptation signal based, at least in part, on the feedback signal; and adjusting a signal processing operation in the communication module responsive to receiving the noise adaptation signal to reduce an effect of noise from the power module on the communication signals.

27. The method of claim 26, wherein adjusting the signal processing operation in the communication module comprises retrieving at least one signal processing parameter from a look up table, and using the at least one signal processing parameter to determine adjusting of the signal processing operation.

28. The method of claim 26, wherein the feedback signal is based, at least in part, on a difference between the voltage from the power module and a reference voltage.

29. The method of claim 27, wherein the at least one signal processing parameter is based, at least in part, on a characterization of noise from the power module.

30. The method of claim 26, wherein the noise adaptation signal is the feedback signal.

31. The method of claim 26, wherein the feedback signal is a switching signal coupled to a switching transistor in the power module.

* * * * *